(12) United States Patent
Lim

(10) Patent No.: US 6,215,262 B1
(45) Date of Patent: Apr. 10, 2001

(54) SPEED CONTROL METHOD FOR SWITCHED RELUCTANCE MOTOR (SRM)

(75) Inventor: Jun Young Lim, Inchon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/396,201

(22) Filed: Sep. 15, 1999

(30) Foreign Application Priority Data

Feb. 1, 1999 (KR) .................................................. 99-3250

(51) Int. Cl.[7] .................................................. H02P 1/18
(52) U.S. Cl. .................................................. 318/254; 388/815
(58) Field of Search .................................. 318/701, 254, 318/138, 439; 388/815

(56) References Cited

U.S. PATENT DOCUMENTS

| | | | |
|---|---|---|---|
| 4,449,082 | * 5/1984 | Webster | 318/326 |
| 4,777,609 | * 10/1988 | Cavill et al. | 364/519 |
| 5,744,927 | * 4/1998 | Hayashida | 318/599 |
| 5,847,524 | * 12/1998 | Erdman et al. | 318/439 |
| 5,955,861 | * 9/1999 | Jeong et al. | 318/701 |

* cited by examiner

Primary Examiner—Robert E. Nappi
Assistant Examiner—Rina I. Duda
(74) Attorney, Agent, or Firm—Fleshner & Kim, LLP

(57) ABSTRACT

A speed control method for an SR motor using a load with a large mechanical inertia that performs a PWM in an acceleration state wherein a speed of the motor radically changes and switches an inverter transistor for a previously determined time in a steady state wherein the speed thereof becomes an uniform level, thereby regularly fixing a time for which a current flows to motor coils connected with the switching transistor.

9 Claims, 4 Drawing Sheets

SPEED CONTROL METHOD FOR SWITCHED RELUCTANCE MOTOR (SRM)

BACKGROUND OF THE INVENTION

1. Field of the Invention

The present invention relates to a speed control method for a Switched Reluctance Motor(SR motor), and more particularly to a speed control for a SR motor when employing a load instance response of which is not large, that is a load having a large mechanical inertia.

2. Description of the Conventional Art

Generally, a pulse width modulation control and a current control are used for an SR motor speed control method. Particularly, the PWM control method controls the operation speed of the SR motor by applying a pulse width modulated signal to a switching transistor on the basis of a pulse corresponding to an output value of a detection sensor which detects a speed, while the current control method prevents an overcurrent from flowing to motor coils by setting a hysteresis band width of a current in a switching interval wherein the switching transistor is switched and switching the switching transistor so that the current applied to the motor coils exists in the hysteresis band width which has been set.

FIG. 1 is a sectional diagram illustrating a three-phase SR motor in general. As shown therein, 10 is a rotor, 20 is a stator, and La,Lb,Lc are coils winding the stator 20.

FIG. 2 is a circuit diagram illustrating a control circuit for controlling a speed of the SR motor in FIG. 1. As shown therein, the control circuit includes an inverter 21 consisting of six switching transistors Q1–Q6, freewheel diodes D1–D6 and a direct current DC condenser C connected with a power supply in parallel, a detection sensor 22 detecting a rotation of the rotor of the motor and outputting a signal in accordance with the detection, a speed detecting unit 23 determining a location of the rotor from the signal outputted from the detection sensor 22 and thereby outputting a detection pulse signal ps, and a speed control unit 24 outputting a plurality of switching signals cs1–cs6 to gates of switching transistors Q1–Q6, respectively, of the inverter 21, the three upper switching transistors Q1–Q3 being serially connected with the three lower switching transistors Q4-Q6 through the coils La,Lb,Lc.

FIG. 3 is a diagram illustrating waveforms of the switching signals cs1,cs4 applied to the gates of the switching transistors, respectively, and a current ia accordingly applied to the A-phase coil La when the three-phase SR motor is controlled in the PWM voltage control method. The speed detecting unit 23 detects a present location of the rotor 10 from the signal supplied from the detection sensor 22 and accordingly outputs detection pulse signals ps1,ps2 to the speed control unit 24 whenever the rotor 10 rotates by predetermined degrees, for example, 60°. When receiving the detection pulse signal ps1, the speed control unit 24 outputs the fourth switching signal cs4 at a high level to the switching transistor Q4 and outputs the first switching signal cs1 repeating the high and low states, that is the pulse width modulated signal, to the first switching transistor Q1. The fourth switching transistor Q4 maintains an on state in accordance with the fourth switching signal cs4, while the first switching transistor Q1 alternately becomes on and off in accordance with the first switching signal cs1. Here, as shown in FIG. 3, a pattern of the current ia flowing to the A-phase coil La has a saw-tooth waveform a size of which gradually increases. When the rotor continuously rotates, that is taking an example of the three-phase, when the rotor rotates by 60° after the second pulse signal ps1 is generated, the speed detecting unit 23 outputs the second detection pulse signal ps2 to the speed control unit 24. Accordingly, the speed control unit 24 outputs the first and fourth switching signals cs1,cs4 at the low state, whereby the first and fourth switching transistors Q1,Q4 are turned off and the current is flowing to the A-phase coil La starts decreasing and eventually becomes zero. The speed control unit 24 outputs the second and fifth signals cs2,cs5 at the high state, whereby the current flows to the B-phase coil Lb (not shown).

Here, when increasing a pulse duty of the first switching signal cs1, it is possible to increase the speed of the motor. Then, since an average time for which the first switching transistor Q1 is turned on while the fourth switching transistor Q4 is turned on increases, an increase interval of the A-phase current ia lengthens and a decrease interval thereof shortens so that the speed of the motor increases.

While, when the load increases, the speed of the motor decreases in proportion to the increased volume of the load, and accordingly an interval T between the first detection pulse signal ps1 and the second detection pulse signal ps2 lengthens. That is, the interval T which is a mechanical angle becomes larger than 60°. In this case, the time for which the fourth switching transistor Q4 is turned on lengthens and the switching time for the first switching transistor Q1 lengthens, whereby the A-phase current ia increases. Further, when the speed of the motor considerably decreases due to radical increase in the load, the interval T abruptly lengthens, which means the switching interval T of the first switching transistor Q1 lengthens, so that the size of the A-phase current ia radically increases, thereby possibly exceeding a rated current. Here, the rated current means a current value above a level by which the motor and the inventor can be damaged. In this case, to prevent the break-down of the motor due to the excessive current, it is required to provide a separate current protecting circuit to cut off the excess current flowing to the system. To provide such a current protecting circuit a complicated circuit is needed and accordingly the manufacturing cost of the system increases.

To prevent the excess current, a control method is applied, which previously sets a predetermined current hysteresis band width and controls the current value not to exist out of the hysteresis band width, such method being called a current control.

FIG. 4 is a diagram illustrating waveforms of the switching signals cs1,cs4 applied to the gates of the switching transistors, respectively, and a current ia accordingly applied to the A-phase coil La when the three-phase SR motor is controlled in the current control.

When the first detection pulse signal ps1 is generated, the speed control unit 24 outputs the first and fourth switching signals cs1,cs4 at a high state and accordingly the A-phase current ia increases. When the value of the A-current ia which has been increasing exceeds the current hysteresis band, the speed control unit 24 turns off the first switching transistor Q1 and thus the A-current ia starts decreasing. When the value of the A-current ia which has been decreasing becomes lower than the current hysteresis band width, the speed control unit 24 turns on the first switching transistor. Such a process is continuously repeated until the second detection pulse signal ps2 is generated. Thus, the A-phase current ia does not exceed the hysteresis band width, thereby preventing the overcurrent from flowing to the A-phase coil La.

In the PWM control system and the current control system, a switching frequency is a radio frequency, which is about 15–20 kHz, thereby preventing noises produced when the switching transistor is switched. However, to perform the high-speed switching an expensive power switching device such as an integrated gate bipolar transistor (IGBT) or a field effect transistor (FET) is required and also a switching loss due to the high-speed switching is unavoidable.

SUMMARY OF THE INVENTION

Accordingly, the present invention is directed to a speed control method for an SR motor which obviates the problems and disadvantages in the conventional art.

An object of the present invention is to provide a speed control method for an SR motor that controls the SR motor using a low-priced regular switching device without employing a high-speed power switching device.

Another object of the present invention is to provide a speed control method for an SR motor that switches a particular switching transistor for a previously set predetermined time in a corresponding switching interval when the SR motor is driven in a steady state.

To achieve these and other advantages and in accordance with the purpose of the present invention, as embodied and broadly described herein, there is provided a speed control method for an SR motor that performs a PWM for acceleration after starting the motor and switches an inverter transistor for a previously determined time in a steady state, thereby regularly fixing a time for which a current flows to motor coils regardless of the change of load of the motor.

Here, it should be noted that the speed control method for the SR motor according to the present invention is only limited to a load of the SR motor with a large mechanical inertia, that is the load instance response of which is not relatively large, because it is difficult to accurately control the speed of the motor with a method that maintains a turn-on state for a fixed time since the speed of the motor is changeable if the mechanical inertia is small.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 2:
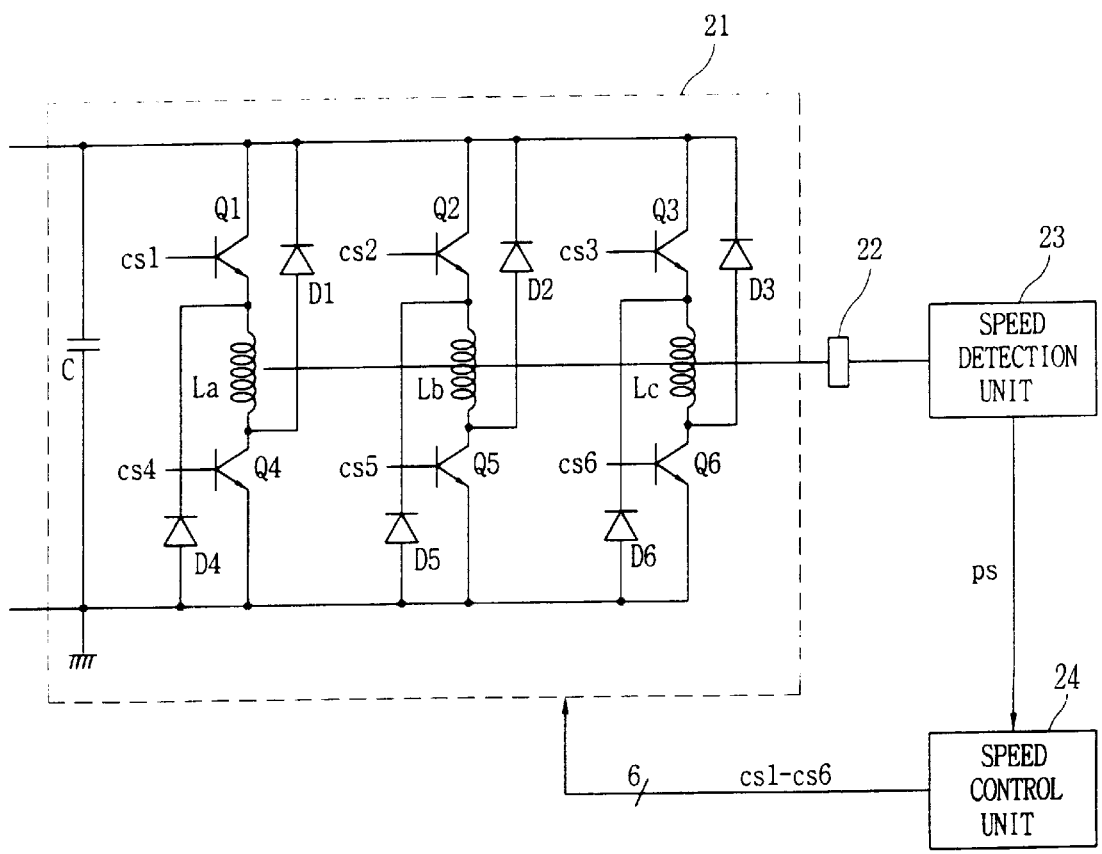
FIG. 2 is a circuit diagram illustrating a circuit for controlling a speed of the three-phase SR motor in FIG. 1.

Since a circuit for performing a speed control method of an SR motor according to the present invention have the same configuration as the circuit in the conventional art illustrated in FIG. 2, the description thereof will be omitted.

Figure 5:
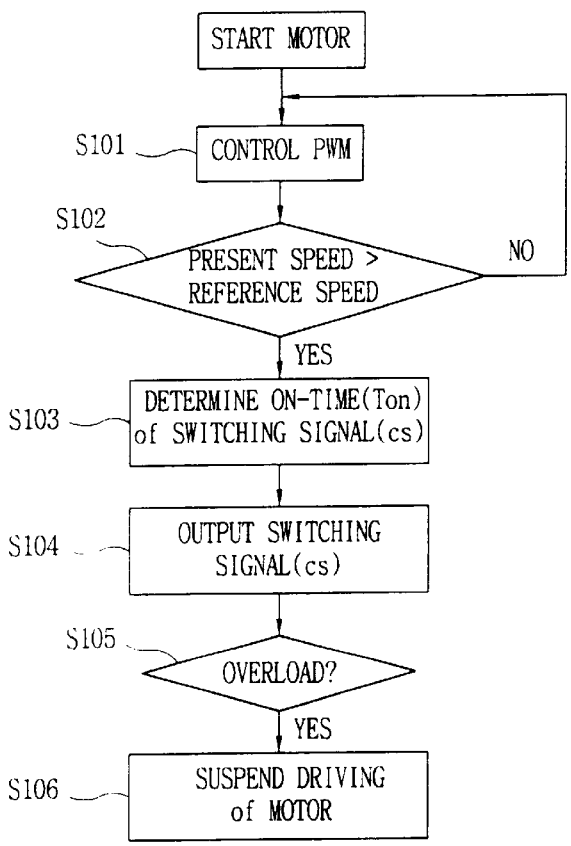
FIG. 5 is a flowchart illustrating a speed control method of an SR motor according to an embodiment of the present invention.

FIG. 5 is a flowchart illustrating a speed control method of an SR motor according to an embodiment of the present invention.

As shown therein, after starting the motor, the PWM control is performed (S101), and the PWM control is continuously performed during a transient state in which the speed of the motor radically increases.

While the motor is controlled in the PWM, the speed detection unit 23 outputs the detection pulse signal ps in accordance with a signal outputted from the detection sensor 22 and the speed control unit 24 determines whether the speed of the motor is faster than a previously set reference speed for dividing the motor speed into an excess state and a steady state on the basis of the detection signal ps (S102). When the condition of the step S102 is not satisfied, it is determined that the motor is in the excess state, whereby the PWM is continuously performed, which gradually increases a duty of a pulse of the switching signal so that the speed of the motor gradually increases. In the step S102, when it is determined that the speed of the motor which has gradually increased maintains a regular speed, that is when it is determined that the motor is in the steady state, the speed control unit 24 suspends the PWM control.

Figure 6:
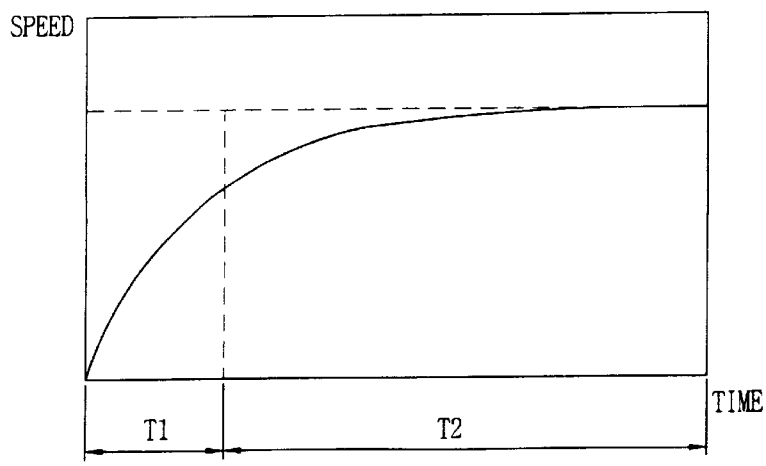
FIG. 6 is a graph illustrating a speed control pattern of an SR motor according to an embodiment of the present invention.

FIG. 6 is a graph illustrating a speed control pattern of the SR motor according to the embodiment of the present invention. As shown therein, a first interval T1 indicates the excess state wherein the speed of the motor radically increases after initially starting the motor and a second interval T2 indicates the steady state wherein after the excess state the speed of the motor becomes relatively uniform. Specifically, in the steady state T2 the speed control unit 24 controls the speed of the motor so that the three upper switching transistors cs1–cs3 of the switching transistors cs1–cs6 of the inverter sequentially maintain the turn-on states for a predetermined time (S103,S104). The steps S103, S104 will be described in detail as follows.

Figure 3:
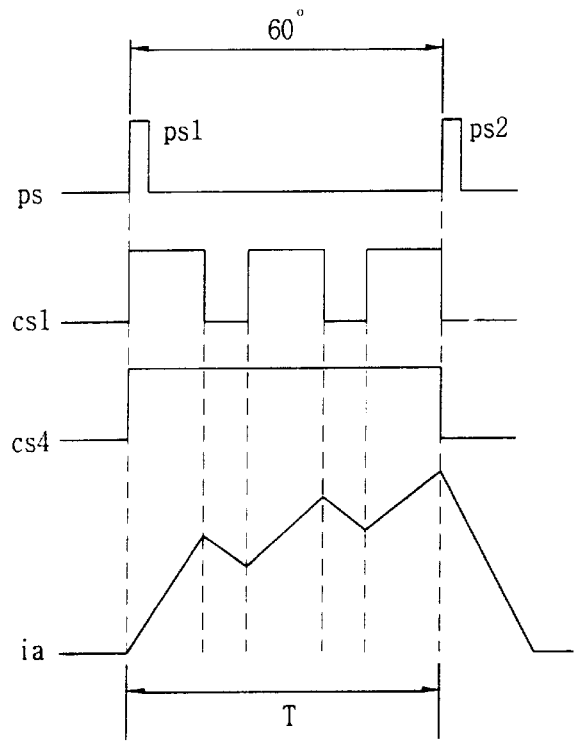
FIG. 3 is a wave-form diagram illustrating waveforms of signal outputted each device and of a current flowing to a coil when controlling the three-phase SR motor in FIG. 1 in a PWM voltage control method.
Figure 4:
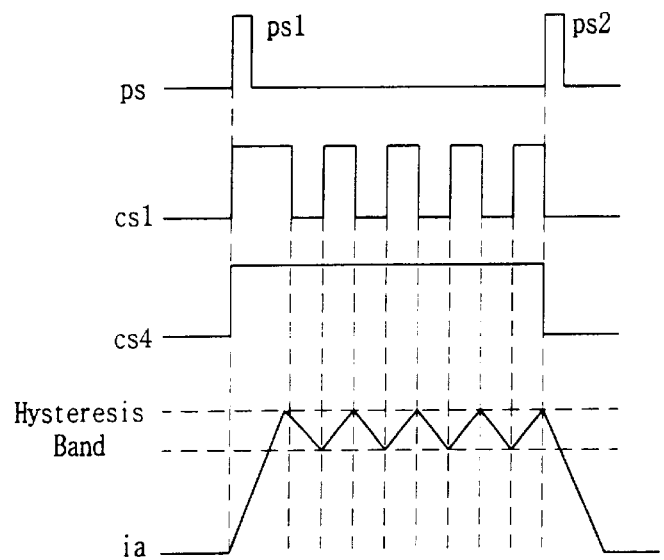
FIG. 4 is a wave-form diagram illustrating waveforms of signal outputted each device and of a current flowing to a coil when controlling the three-phase SR motor in FIG. 1 in a current control method.

The operation of the steps S103,S104, which will be referred as a dwell control for the convenience of the explanation, is opposite to which the switching signal switches to the high frequency. In other word, when the PWM is performed, in the interval T shown in FIG. 3 the switching signal cs1 is switched to the high radio frequency, for example 10 kHz to 20 kHz, while in the dwell control the switching signal cs1 maintains the on state for the predetermined time. Here, the switching signal cs4 also maintains the on state that is identically applied to the PWM control method.

Figure 1:
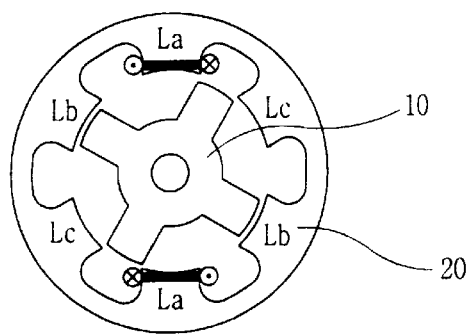
FIG. 1 is a sectional diagram illustrating a three-phase SR motor in general.
Figure 7A:
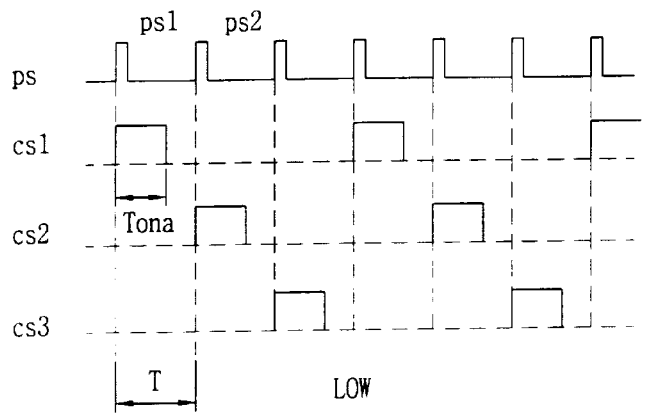
FIGS. 7A through 7C are diagrams illustrating waveforms of switching signals applied to gates of switching transistors when controlling the three-phase SR motor in FIG. 1 in a dwell control method.
Figure 7B:
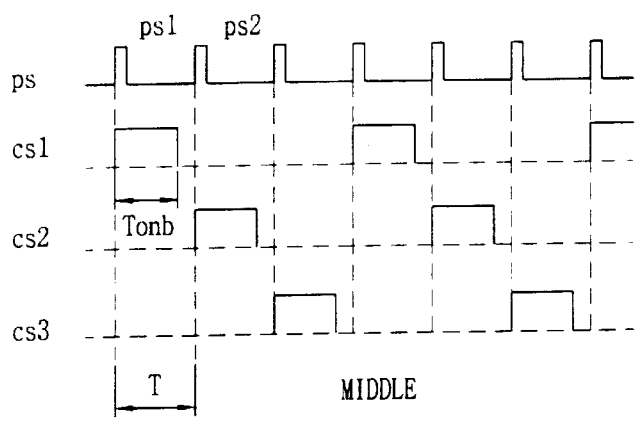
Figure 7C:
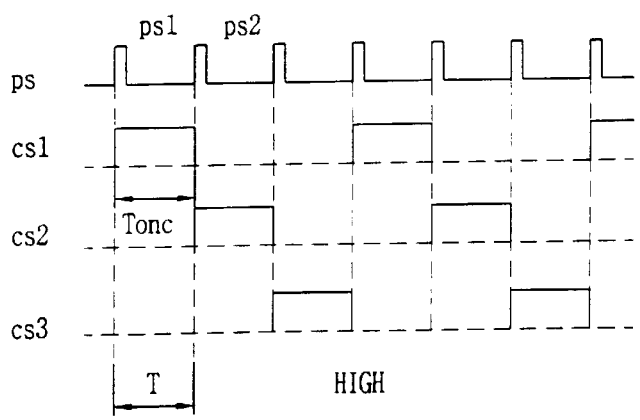

FIGS. 7A through 7C are diagrams illustrating waveforms of switching signals cs1–cs3 applied to the gates Q1–Q3 of the switching transistors when controlling the three-phase SR motor in FIG. 1 in the dwell control method. The other three lower switching transistors cs4–cs6 maintain the on-state during the interval wherein the three upper switching transistors cs1–cs3 which are respectively connected thereto in series are turned on. Such an operation is the same as the conventional art.

Specifically, FIGS. 7A through 7B illustrate patterns of the switching signals cs1,cs2,cs3 when operating the motor at low, middle and high speeds, respectively. A pulse width Tona of the switching signal cs1 at the low speed as shown in FIG. 7A is shorter than a pulse width Tonb thereof at the middle speed in FIG. 7B and a pulse width Tonc of the switching signal cs1 at the middle speed as shown in FIG. 7C is longer than the pulse width Tonb thereof at the middle speed. The other switching signals cs2,cs3 have the same application. A length of each of the pulse widths Tona,Tonb, Tonc of the switching signals relates to conception of a time and as the pulse widths Tona,Tonb,Tonc, that is the on-times increase, the time for which the current flows to the corresponding coils La,Lb,Lc accordingly increases, whereby the rotation of the rotor 10 becomes faster.

In the speed control unit 24, the pulse widths Tona,Tonb, Tonc of the switching signals corresponding to the desirable rotation speed of the motor, that is the on times Tona,Tonb, Tonc of the switching signals are stored in a table type.

When it is determined that the motor is in the steady state in the step S102, the speed control unit 24 suspends the PWM, determines a present speed of the motor from the detection pulse signal ps and determines the pulse widths Tona,Tonb,Tonc of the switching signals cs1–cs3 in consideration of the present speed and the desirable control speed of the motor (S103), and then applies the switching signals cs1–cs3 with the pulse widths Tona,Tonb,Tonc to the switching transistors Q1–Q3, respectively (S104).

For instance, the speed control unit 24 outputs the switching signal cs1 having the pulse width Tona in accordance with the input of the first detection pulse signal ps1 and outputs the switching signal cs4 having the pulse width T. Accordingly, the switching transistor Q1 is turned on during the on-time Tona and the switching transistor Q4 serially connected with the switching transistor Q1 through the A-phase coil, whereby the current flows to the A-phase coil La for the on-time Tona. When the on-time elapses, the current flowing to the A-phase coil La starts decreasing.

After the first detection pulse signal ps1 is inputted, when a predetermined time T has elapsed and the second detection pulse signal ps2 is inputted, the speed detection unit 24 outputs the switching signal cs2 having the pulse width Tona and the switching signal cs5 having the pulse width of the time T, so that the current flows to the B-phase coil Lb during the on-time Tona. Thus, the motor can be controlled by which the above process is repeatedly performed.

When the speed of the motor rapidly decreases due to the sudden increase in the load, the intervals T shown in FIGS. 7a, 7b and 7c increase and the turn-on intervals T of the switching signals cs3–cs6 also lengthen, whereby the turn-on times of the three lower switching transistors Q4–Q6 accordingly lengthen.

The on-times Tona of the switching signals cs1–cs3 are already determined, so that even though the load radically increases, the on-time of the three upper switching transistors Q1–Q3 do not change. Thus, since the volume of the current flowing to each of the phase coils La,Lb,Lc does not vary, the overcurrent does not flow to the motor coils and the switching devices although the speed of the motor radically decreases due to the sudden increase in the load, thereby enabling a protecting operation that prevents the breakdown of the motor coils and switching devices.

As described above, the speed control method for the SR motor according to the present invention previously sets the on-time of the switching signal, so that the uniform current is always provided regardless of the radical increase in the load of the motor. Accordingly, there is an advantage in that the motor is not broken down even in the radical increase in the load of the motor.

While, when the speed control of the motor is reduced due to the overload, the interval wherein the power is applied to the motor decreases, which leads to the reduction of the volume of the power applied to the motor. Further, when the speed decreases, the speed control unit 24 does not output the switching signals cs1–cs6, thereby suspending the driving of the motor (S105). The determination of the overload can be made in consideration of the specification of the motor.

According to the present invention, the description was made, for the convenience of explanation, regarding to which each of the switching signals cs1–cs3 consists of a single pulse which is turned on during the predetermined time Tona, in the interval T, until the second detection pulse signal ps2 is outputted after the first detection pulse signal ps1 is outputted, but it does not matter how many pulses constitute each of the switching signals cs1–cs3 during the predetermined time Tona, but matters that the predetermined time Tona is previously set and the pulse output time is set by the predetermined time Tona. The number of the switching pulses which are turned on during the predetermined time Tona relates to the pattern of the motor torque so that when an appropriate torque pattern is determined in accordance with a type of the load, the number of the switching pulses can be determined in accordance with the determined torque pattern.

As described above, the speed control method for the SR motor according to the present invention applies the PWM when the motor is in the excess state and the dwell control in the steady state, whereby in the excess state and the steady state the switching frequency of the switching transistor considerably decreases compared to the PWM applied in the conventional art, thereby being capable of employing a general switching device without using an expensive power switching device. Also, since the current applied to the motor coils does not radically increase, a separate current protecting circuit is not required. In addition, the switching loose is reduced by which the switching frequency decreases according to the present invention, thereby improving the efficiency of the motor system and since it is possible to expect the rotation angle of the motor with respect to the time in the load which is the same as the fan that operates for a long time at a regular speed, the speed control method for the SR motor according to the present invention becomes more useful.

It will be apparent to those skilled in the art that various modifications and variations can be made in the speed control method for the SR motor of the present invention without departing from the spirit or scope of the invention. Thus, it is intended that the present invention cover the modifications and variations of this invention provided they come within the scope of the appended claims and their equivalents.

What is claimed is:

1. A speed control method for a switched reluctance motor using a load with a large mechanical inertia, the speed control method for the switched reluctance motor, comprising:

operating the motor using a pulse width modulated signal and increasing a speed of the motor;

checking the speed of the motor, thereby determining whether the motor is in a steady state;

determining pulse widths of transistor switching signals corresponding to the steady state of the motor once the motor has reached steady state operation;

switching an inverter switching transistor using the transistor switching signals corresponding to the steady state of the motor thereby uniformly fixing a time for which a current flows to motor coils regardless of a change of the motor load.

2. The method according to claim 1, wherein the steady state of the motor is determined by comparing a present speed of the motor with a previously set reference speed.

3. The method according to claim 1, further comprising: suspending the driving of the motor when the motor is overloaded and thus the speed of the motor becomes below a previously set speed, whereby the motor has stability to the overload without a current sensor.

4. A speed control method for a switched reluctance motor using a load with a large mechanical inertia, which comprises a detection sensor for detecting a rotation of a motor rotor, a speed detecting unit for determining a location of the rotor in accordance with a signal supplied from the detection sensor and outputting a detection pulse signal in accordance with the determination and a speed control unit for outputting switching signals to a plurality of inverter switching transistors, respectively, the speed control method for the switched reluctance motor comprising:

operating the motor using a pulse width modulated signal and increasing the speed of the motor;

checking the speed of the motor, thereby determining whether the motor is in a steady state;

determining pulse widths of transistor switching signals from the detection sensor corresponding to the steady state of the motor once the motor has reached steady state operation; and outputting an on-state transistor switching signal tone of the switching transistors after the detection pulse signal is inputted and outputting to another corresponding switching transistor serially connected with the above switching transistor a switching signal that maintains an on-state according to determined transistor switching signal times from the detection sensor measured at the steady state operation of the motor thereby uniformly fixing a time for which a current flows to motor coils connected with the two switching transistors.

5. The method according to claim 4, wherein the steady state of the motor is determined by comparing a present speed of the motor with a previously set reference speed.

6. The method according to claim 4, wherein another corresponding switching transistor is switched at least once according to determined transistor switching signal times.

7. The method according to claim 4, further comprising: suspending the driving of the motor when the motor is overloaded and thus the speed of the motor becomes below a previously set speed, whereby the motor has stability to the overload without a current sensor.

8. A speed control method for a switched reluctance motor using a load with a large mechanical inertia, the speed control method for the switched reluctance motor comprising:

operating the motor using a pulse width modulated signal and increasing a speed of the motor;

checking the speed of the motor, thereby determining whether the motor is in a steady state;

switching an inverter switching transistor for a previously set time when the motor is in the steady state or close thereto, thereby uniformly fixing a time for which a current flows to motor coils regardless of a change in the motor load; and suspending driving of the motor when the motor is overloaded in which the speed of the motor falls below a previously set speed, whereby the motor has stability to the overload without a current sensor.

9. A speed control for a switched motor with a large mechanical inertia, which comprises a detection sensor for detecting a rotation of a motor rotor, a speed detecting unit for determining a location of the rotor in accordance with a signal supplied from the detection sensor and outputting a detection pulse signal in accordance with the determination and a speed control unit for outputting switching signals to a plurality of inverter switching transistors, respectively, the speed control method for the switched reluctance motor comprising:

operating the motor using a pulse width modulated signal and increasing the speed of the motor;

checking the speed of the motor, thereby determining whether the motor is in a steady state; and outputting an on-state switching signal tone of the switching transistors after the detection pulse signal is inputted and outputting to another corresponding switching transistor serially connected with the above switching transistor a switching signal that maintains an on-state for a previously set predetermined time when determining that the motor is in the steady state, thereby uniformly fixing a time for which a current flows to motor coils connected with the two switching transistors; and suspending driving of the motor when the motor is overloaded in which the speed of the motor falls below a previously set speed, whereby the motor has stability to the overload without a current sensor.

\* \* \* \* \*